US012566918B2

(12) United States Patent
Yamashita et al.

(10) Patent No.: US 12,566,918 B2
(45) Date of Patent: Mar. 3, 2026

(54) DOCUMENT MANAGEMENT SYSTEM FOR ADDING APPENDED INFORMATION INDICATING CHANGES MADE TO THE DOCUMENT TO THE REVISED DOCUMENT

(71) Applicant: TOYOTA JIDOSHA KABUSHIKI KAISHA, Toyota (JP)

(72) Inventors: Hiroyasu Yamashita, Toyota (JP); Harufumi Muto, Miyoshi (JP); Yosuke Ueno, Nagoya (JP); Kazuya Matsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 18/537,829

(22) Filed: Dec. 13, 2023

(65) Prior Publication Data

US 2024/0232523 A1 Jul. 11, 2024

(30) Foreign Application Priority Data

Jan. 10, 2023 (JP) ................................. 2023-001691

(51) Int. Cl.
| | |
|---|---|
| *G06F 40/197* | (2020.01) |
| *G06F 40/137* | (2020.01) |
| *G06F 40/169* | (2020.01) |
| *G06F 40/194* | (2020.01) |

(52) U.S. Cl.
CPC .......... *G06F 40/197* (2020.01); *G06F 40/137* (2020.01); *G06F 40/169* (2020.01); *G06F 40/194* (2020.01)

(58) Field of Classification Search
CPC .... G06F 40/197; G06F 40/137; G06F 40/169; G06F 40/194; G06F 16/11; G06F 18/22
See application file for complete search history.

(56) References Cited

U.S. PATENT DOCUMENTS

| | | | |
|---|---|---|---|
| 9,275,368 B1 * | 3/2016 | Harpalani .............. | G06Q 10/10 |
| 10,599,753 B1 * | 3/2020 | Eisner ................... | G06F 40/197 |
| 2002/0002567 A1 * | 1/2002 | Kanie ................... | G06F 40/194 |
| | | | 715/256 |
| 2004/0194025 A1 | 9/2004 | Hubert et al. | |
| 2004/0243403 A1 | 12/2004 | Matsunaga et al. | |
| 2004/0268254 A1 * | 12/2004 | Fujiwara ................ | G06F 16/93 |
| | | | 715/255 |
| 2009/0249224 A1 * | 10/2009 | Davis ................... | G06F 40/169 |
| | | | 715/753 |

(Continued)

FOREIGN PATENT DOCUMENTS

| | | |
|---|---|---|
| JP | 2001125930 A | 5/2001 |
| JP | 2004355074 A | 12/2004 |

(Continued)

*Primary Examiner* — Asher D Kells

(57) ABSTRACT

Appended information is accumulated for each block of a first document before revision. A second document, which is a revised version of the first document, is divided into blocks. Each of the blocks of the first document, from which the appended information is removed, is compared with the blocks of the second document. The blocks of the first document are associated with the blocks of the second document on a one-to-one basis. The appended information related to the blocks of the first document is added to the blocks of the second document.

3 Claims, 4 Drawing Sheets

(56) References Cited

U.S. PATENT DOCUMENTS

| | | | | |
|---|---|---|---|---|
| 2014/0115436 A1* | 4/2014 | Beaver | .................. | G06F 40/197 |
| | | | | 715/229 |
| 2016/0092422 A1* | 3/2016 | Maglieri | ............... | G06Q 10/10 |
| | | | | 715/751 |
| 2017/0161246 A1* | 6/2017 | Klima | .................... | G06F 40/58 |

FOREIGN PATENT DOCUMENTS

| | | | |
|---|---|---|---|
| JP | 2005202509 A | 7/2005 |
| JP | 2007140836 A | 6/2007 |
| JP | 2022175298 A | 11/2022 |

* cited by examiner

Fig.4

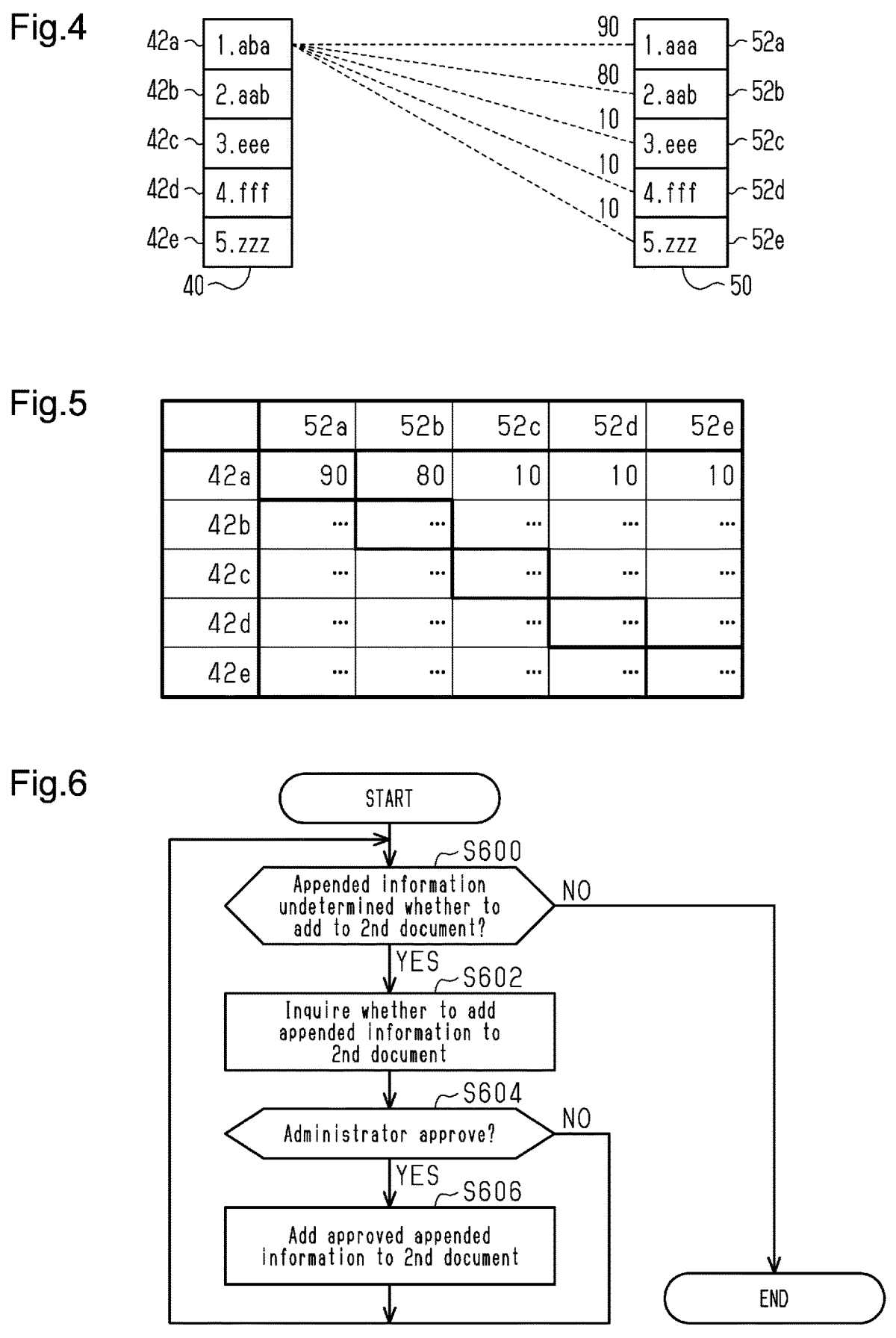

| 42a | 1.aba |
| 42b | 2.aab |
| 42c | 3.eee |
| 42d | 4.fff |
| 42e | 5.zzz |

40

90
80
10
10
10

| 1.aaa | 52a |
| 2.aab | 52b |
| 3.eee | 52c |
| 4.fff | 52d |
| 5.zzz | 52e |

|     | 52a | 52b | 52c | 52d | 52e |
|-----|-----|-----|-----|-----|-----|
| 42a | 90  | 80  | 10  | 10  | 10  |
| 42b | ... | ... | ... | ... | ... |
| 42c | ... | ... | ... | ... | ... |
| 42d | ... | ... | ... | ... | ... |
| 42e | ... | ... | ... | ... | ... |

Fig.6

```
                    START
                      │
                      ▼        ┌─S600
         ┌────────────────────────┐
         │ Appended information   │        NO
         │ undetermined whether to├──────────────┐
         │  add to 2nd document?  │              │
         └────────────────────────┘              │
                      │ YES                       │
                      ▼        ┌─S602             │
         ┌────────────────────────┐              │
         │ Inquire whether to add │              │
         │ appended information to│              │
         │     2nd document       │              │
         └────────────────────────┘              │
                      │        ┌─S604             │
                      ▼                           │
         ┌────────────────────────┐    NO         │
         │ Administrator approve? ├──────┐        │
         └────────────────────────┘      │        │
                      │ YES              │        │
                      ▼        ┌─S606     │        │
         ┌────────────────────────┐      │        │
         │  Add approved appended │      │        │
         │ information to 2nd document   │        │
         └────────────────────────┘      │        │
                      │                  │        ▼
                      ▼                  └──────▶ END
```

DOCUMENT MANAGEMENT SYSTEM FOR ADDING APPENDED INFORMATION INDICATING CHANGES MADE TO THE DOCUMENT TO THE REVISED DOCUMENT

RELATED APPLICATION

The present application claims priority of Japanese Patent Application No. 2023-001691 filed on Jan. 10, 2023, the disclosure of which is hereby incorporated by reference herein in its entirety.

BACKGROUND

1. Field

The following description relates to a document management system.

2. Description of Related Art

A known technique reads two documents having similar structures and associates the sentences included in one of the documents with the sentences included in the other. The two documents are, for example, a legal document before revision and a legal document after revision. Japanese Laid-Open Patent Publication No.2004-355074 discloses an example of a device that obtains a correspondence relationship between blocks of one document and blocks of another document based on the hierarchical structures of the two documents. A block is, for example, a chapter.

Japanese Laid-Open Patent Publication No. 2001-125930 discloses a technique that accumulates appended information, which is data indicating a change to a document or the like.

After a user expends some efforts to add appended information to a legal document issued by an authority, the authority may issue a revised legal document. In such a case, the revised legal document issued by the authority does not include the appended information. Accordingly, there is a need for efficient transfer of the appended information added to the legal document before revision to the legal document after revision. Thus, there is a demand for a system that allows appended information included in one of two structurally similar documents to be efficiently added to the other document.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a document management system includes processing circuitry and a storage device. The processing circuitry is configured to store a first document created by an authority in the storage device. The processing circuitry is configured to divide the first document into blocks based on a hierarchical structure of the first document. The processing circuitry is configured to store and accumulate appended information in the storage device for each of the blocks of the first document. The appended information is data indicating a change added to the first document by a user. The processing circuitry is configured to store a second document created by the authority in the storage device. The second document is a revised version of the first document. The processing circuitry is configured to divide the second document into blocks based on a hierarchical structure of the second document. The processing circuitry is configured to compare each of the blocks of the first document, from which the appended information is removed, with at least one of the blocks of the second document. The processing circuitry is configured to associate a first block of the blocks of the first document with a second block of the blocks of the second document. The first block and the second block have a similarity greater than or equal to a determination value through the comparison. The processing circuitry is configured to add the appended information related to the first block to the second block that is associated with the first block.

Other features and aspects will be apparent from the following detailed description, the drawings, and the claims.

BRIEF DESCRIPTION OF THE DRAWINGS

FIG. 4 is a diagram illustrating a process for comparing each of the blocks of the first document with the blocks of the second document.

FIG. 5 is a diagram illustrating a similarity between each of the blocks of the first document and each of the blocks of the second document.

FIG. 6 is a flowchart of a process for inquiring an administrator whether to add the appended information to the second document.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A document management system in accordance with a first embodiment will now be described with reference to the drawings.

Schematic Diagram of Document Management System 10

Figure 1:
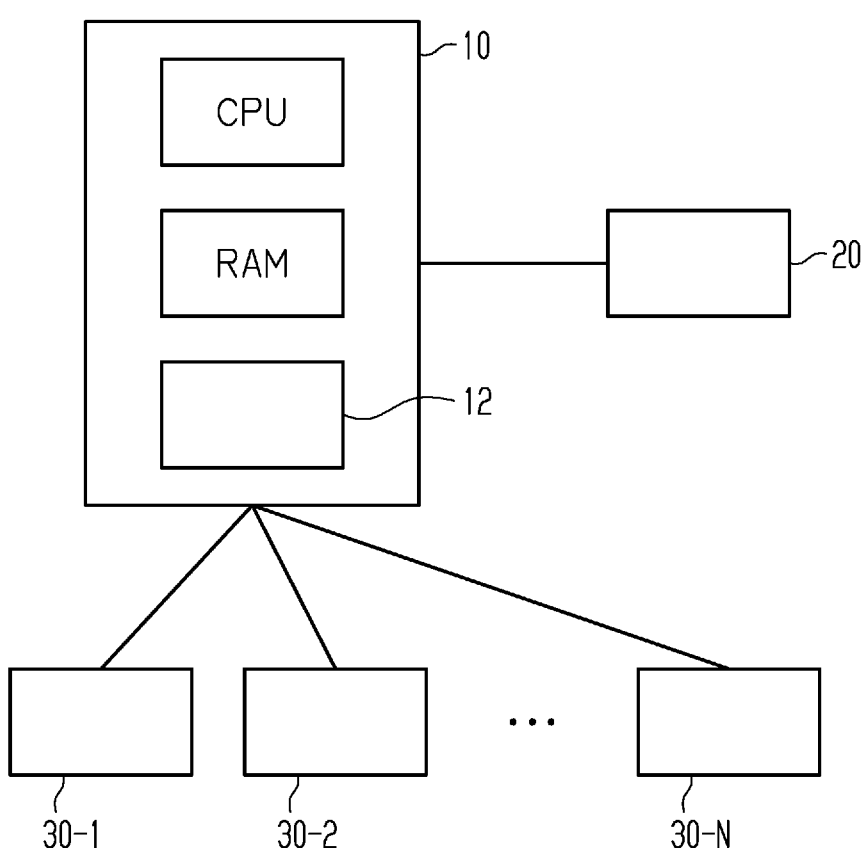
FIG. 1 is a schematic diagram of a document management system according to a first embodiment.

FIG. 1 illustrates a document management system 10. The document management system 10 includes a CPU, a RAM, and a storage device 12. The storage device 12 is, for example, a ROM. An administrator computer 20 and a number of client computers 30-1, 30-2, . . . , and 30-N are connected to the document management system 10 in a manner allowing for communication. The administrator computer 20 is capable of changing documents stored in the document management system 10. The client computers 30-1, 30-2, . . . , and 30-N are capable of accessing the documents stored in the document management system 10.

Figure 2:
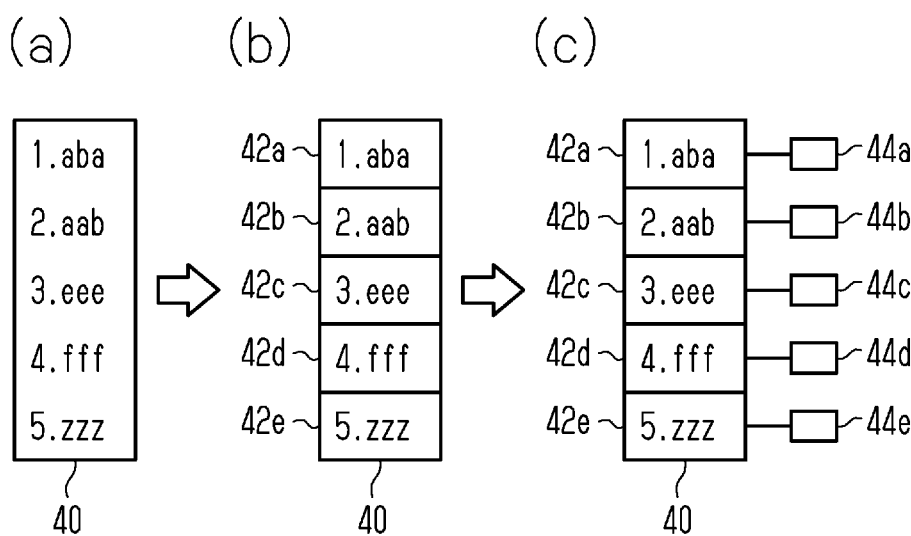
FIG. 2 is a diagram illustrating an aspect in which appended information is accumulated for each block of the first document.

Section (a) of FIG. 2 shows a first document 40 created by an authority. The document management system 10 stores the first document 40 created by the authority in the storage device 12. In the present embodiment, the first document 40 is a legal document including a plurality of provisions.

As shown in Section (b) of FIG. 2, the document management system 10 divides the first document 40 into blocks 42a to 42e based on the hierarchical structure of the first document 40. In this embodiment, the blocks 42a to 42e are chapters. One chapter may include a plurality of paragraphs. Each of the blocks 42a to 42e forms a unit in which one or more sentences are collected. The blocks 42a to 42e may be paragraphs, sections, subsections, or the like.

As shown in Section (c) of FIG. 2, the document management system 10 stores and accumulates appended information 44a to 44e in the storage device 12 for each of the blocks 42a to 42e of the first document 40. The appended information 44a to 44e each indicates a change added to the first document 40 by a user. Specifically, the appended information 44a to 44e is, for example, text editing information. The text editing information is related to, for example, change in the text contents, merge of chapters, division of chapters, and deletion of chapters. A change in the text contents is, for example, correction of an error included in the first document 40 or an annotation added to a term included in the first document 40. Specific examples of the appended information 44a to 44e include supplementary notes, attached files, and links.

In an example, a second document 50, which is a revised version of the first document 40, is created by the authority after the appended information 44a to 44e is stored and accumulated in the storage device 12. The second document 50 is also a legal document including a plurality of provisions.

Figure 3:
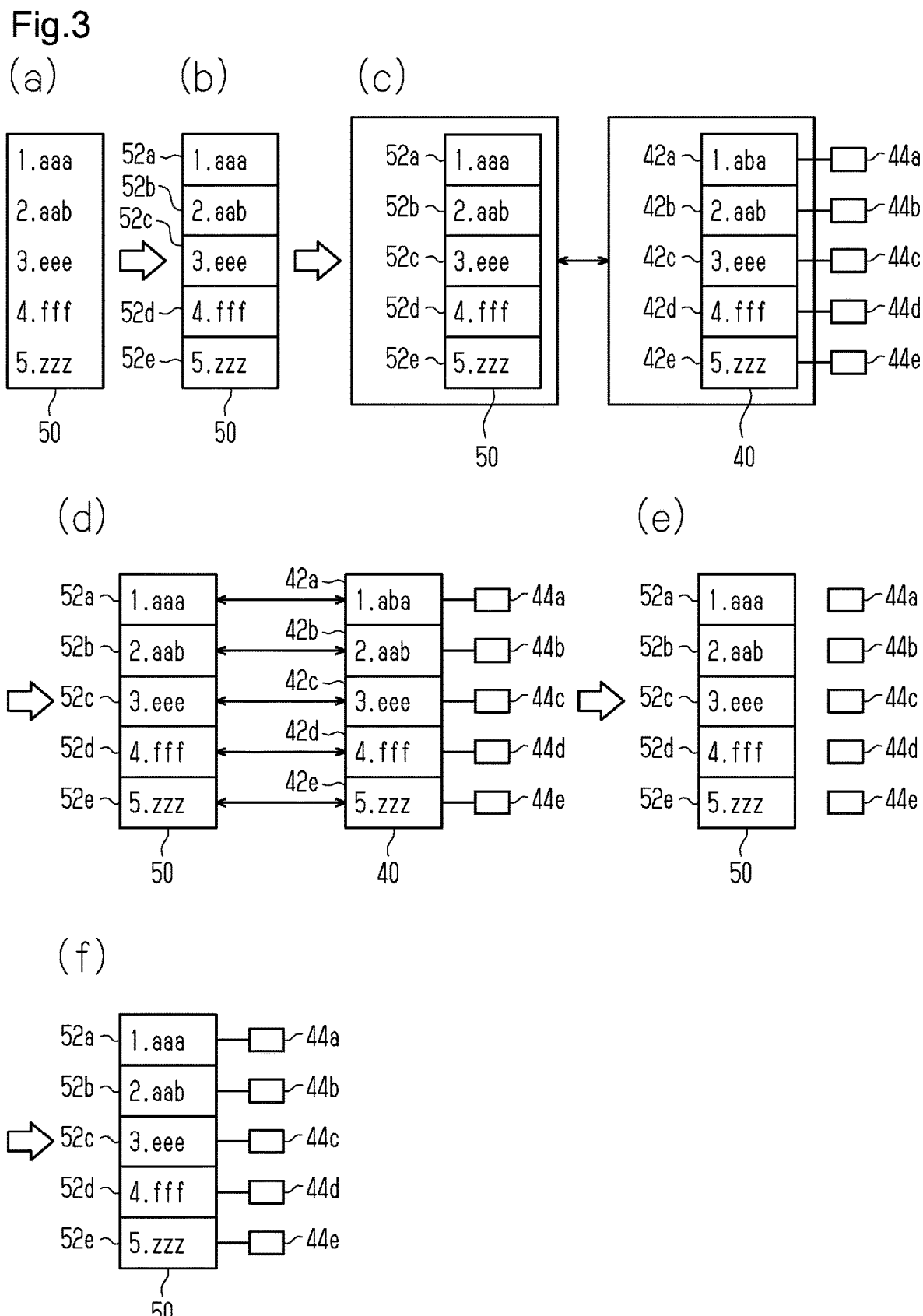
FIG. 3 is a diagram illustrating association between the blocks of the first document and blocks of a second document.

Section (a) of FIG. 3 shows the second document 50 created by the authority. The document management system 10 stores the second document 50, which is the revised version of the first document 40, created by the authority in the storage device 12.

As shown in Section (b) of FIG. 3, the document management system 10 divides the second document 50 into blocks 52a to 52e based on the hierarchical structure of the second document 50.

As shown in Section (c) of FIG. 3, the document management system 10 compares each of the blocks 42a to 42e of the first document 40, from which the appended information 44a to 44e is removed, with the blocks 52a to 52e of the second document 50.

FIG. 4 shows, in particular, a comparison of the block 42a of the first document 40 with the blocks 52a to 52e of the second document 50. The similarities between the block 42a of the first document 40 and the blocks 52a to 52e of the second document 50 are 90, 80, 10, 10, and 10, respectively. The similarity can be calculated using a machine learning model, for example. In this case, the similarity between sentences can be obtained as a numerical value by vectorizing a subject sentence and inputting the vectorized sentence to a machine learning model that has already undergone learning. An example of such a model is a SentenceBERT. In the present embodiment, the similarity is expressed by a score of 0 to 100.

FIG. 5 shows the results of comparison between each of the blocks 42a to 42e of the first document 40 with the blocks 52a to 52e of the second document 50. The document management system 10 executes association so that the total value of the similarities is maximized. As indicated by the thick frame shown in FIG. 5, the blocks 42a to 42e of the first document 40 are associated with the blocks 52a to 52e of the second document 50 on a one-to-one basis.

Some restrictions may be imposed when performing the association. For example, when the block 42a is associated with the block 52b, the block 42b may be prohibited from being associated with the block 52a. That is, a preceding block of the second document 50 is associated with a preceding block of the first document 40, and a subsequent block of the second document 50 is associated with a subsequent block of the first document 40. This restriction may be mitigated. For example, one block of the first document 40 is associated with one block of the second document 50 in advance. A block of the first document 40 subsequent to the associated block may be associated with a block of the second document 50 that precedes the associated block by a predetermined number.

The restrictions imposed on association include the following, in addition to or instead of that described above. For example, a chapter includes a plurality of paragraphs, and a block is a paragraph. In this case, the chapters of the first document 40 are associated with the chapters of the second document 50 on a one-to-one basis. The blocks in one chapter of the first document 40 may be prohibited from being associated with the blocks in chapters other than the corresponding one of the second document 50.

In the present embodiment, the document management system 10 associates the blocks 42a to 42e of the first document 40 with the blocks 52a to 52e of the second document 50 on a one-to-one basis. This association is indicated by the double-headed arrows shown in Section (d) of FIG. 3. One of the blocks 42a to 42e of the first document 40 is associated with one of the blocks 52a to 52e of the second document 50 that have a similarity greater than or equal to a determination value through the comparison. In FIG. 5, thick lines enclose the combinations of the blocks 42a to 42e of the first document 40 having a similarity greater than or equal to the determination value. As shown in FIG. 5, the block 42a of the first document 40 is associated with the block 52a of the second document 50. The block 42b of the first document 40 is associated with the block 52b of the second document 50. The block 42c of the first document 40 is associated with the block 52c of the second document 50. The block 42d of the first document 40 is associated with the block 52d of the second document 50.

The block 42e of the first document 40 is associated with the block 52e of the second document 50.

As shown in Section (e) of FIG. 3, the blocks 52a to 52e of the second document 50 are the candidates to which the appended information 44a to 44e is added.

A process for adding the appended information 44a to 44e to the blocks 52a to 52e, respectively associated with the blocks 42a to 42e, will now be described with reference to FIG. 6.

In step S600, the document management system 10 determines whether there is appended information that is not yet determined to be added to the second document 50. When the document management system 10 executes step S600 in an initial process, the appended information that is not yet determined to be added to the second document 50 corresponds to the appended information 44a to 44e.

When an affirmative determination is given in step S600 (S600: YES), the document management system 10 proceeds to step S602. In step S602, the document management system 10 inquire the administrator whether to add the appended information 44a related to the block 42a to the block 52a that is associated with the block 42a. The administrator is a user who accesses the document management system 10 using the administrator computer 20 of the document management system 10. Then, the document management system 10 proceeds to step S604.

When the administrator approves the adding (S604: YES), the document management system 10 proceeds to step S606. In step S606, the document management system 10 adds the appended information 44a related to the block 42a to the block 52a that is associated with the block 42a. In this manner, the document management system 10 adds the appended information 44a related to the block 42a to the block 52a that is associated with the block 42a in response to the approval by the administrator.

When the administrator does not approve the adding (S604: NO), the document management system 10 does not add the appended information 44a related to the block 42a to the second document 50. For example, the appended information 44a is information related to correction of an error in the first document 40. However, the second document 50 does not include the same error in the first document 40. In such a case, the administrator does not approve the adding. Therefore, the document management system 10 does not add the appended information 44a related to the block 42a to the second document 50.

The document management system 10 repeatedly executes steps S600 to S606. When all the appended information 44a to 44e is either added or determined not to be added to the second document 50 (S600: NO), the document management system 10 ends the process of FIG. 6.

As shown in Section (f) of FIG. 3, in the present embodiment, the appended information 44a to 44e is added to the blocks 52a to 52e of the second document 50, respectively.

Advantages of First Embodiment (1-1) The first document 40, from which the appended information 44a to 44e is removed, is compared with the second document 50. In a comparative example, the second document 50 is compared with the first document 40 including the appended information 44a to 44e. In accordance with the first embodiment, one of the blocks 42a to 42e of the first document 40 is easily associated with one of the blocks 52a to 52e of the second document 50 as compared with the comparative example. The reason for this will be described below. In an example, one block of the first document 40 from which the appended information 44a to 44e is removed is identical to one block of the second document 50 before the appended information 44a to 44e is added. In the comparative example, the appended information 44a to 44e may cause these blocks to be determined as dissimilar. That is, the association may fail in the comparative example. On the other hand, the first embodiment eliminates the possibility of association failures caused by the appended information 44a to 44e.

Therefore, the appended information 44a to 44e accumulated for each of the blocks 42a to 42e of the first document 40 are easily transferred to the second document 50.

(1-2) The administrator determines whether to add the appended information 44a to 44e to the second document 50. This ensures the validity of adding the appended information 44a~44e to the second document 50.

(1-3) The legal document includes a plurality of provisions. When a legal document is revised, the provision numbers are often maintained even if some provisions are deleted. This facilitates association of the blocks 42a to 42e of the first document 40 with the blocks 52a to 52e of the second document 50. Thus, the document management system 10 is highly useful in a situation in which the first document 40 and the second document 50 are legal documents.

Second Embodiment

A document management system in accordance with a second embodiment will now be described with reference to the drawings. The configuration of the document management systems 10 in the second embodiment that is the same as that in the first embodiment will not be described.

Figure 7:
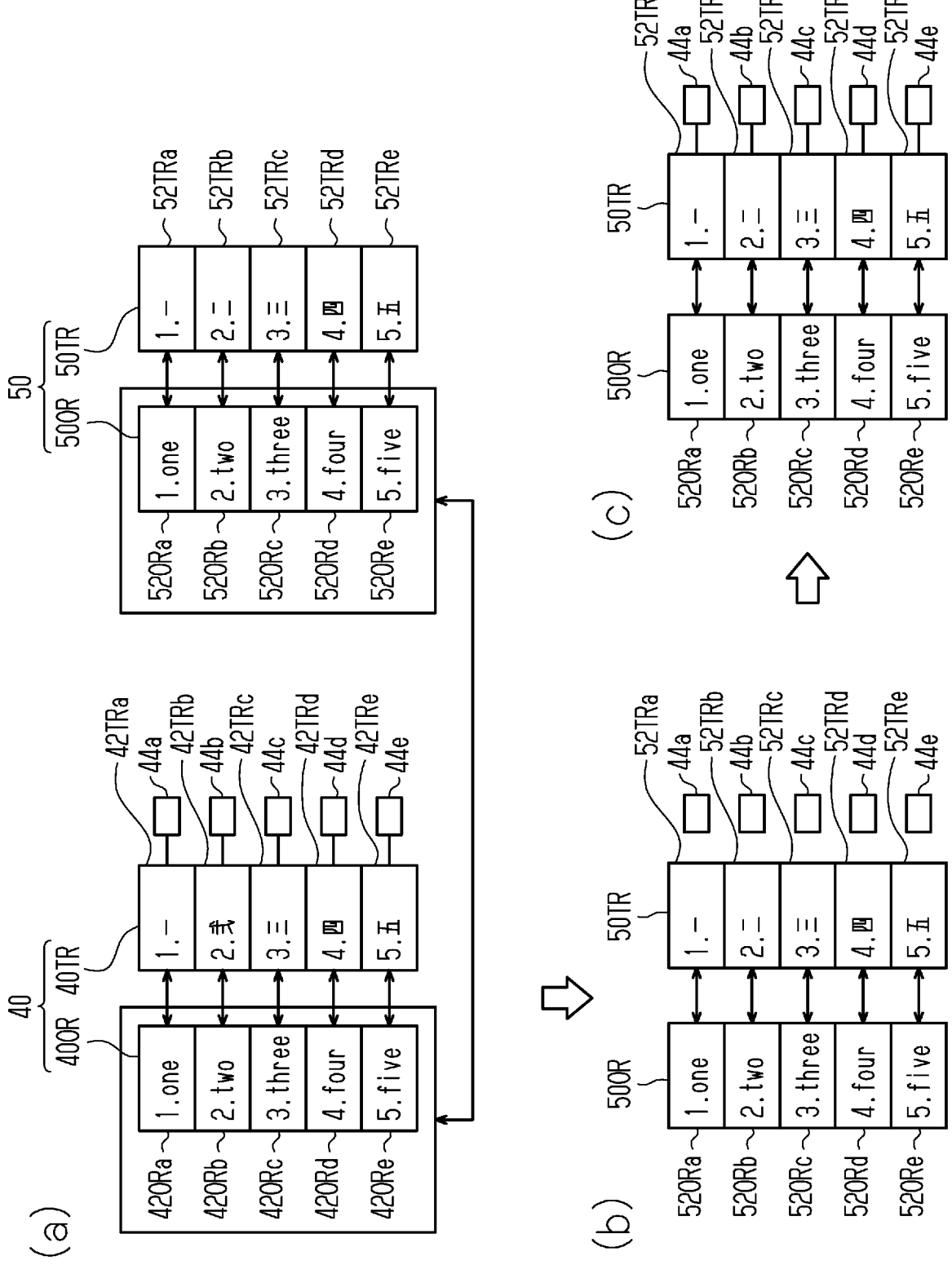
FIG. 7 is a diagram illustrating a process executed by the document management system according to a second embodiment.

As shown in Section (a) of FIG. 7, the first document 40 includes a first original text data 40OR and a first translation data 40TR obtained by translating the first original text data 40OR. The second document 50 includes a second original text data 50OR and a second translation data 50TR obtained by translating the second original text data 50OR. Blocks 42ORa to 42ORe of the first original text data 40OR are associated with blocks 42TRa to 42TRe of the first translation data 40TR on a one-to-one basis. Blocks 52ORa to 52ORe of the second original text data 50OR are associated with blocks 52TRa to 52TRe of the second translation data 50TR on a one-to-one basis.

The document management system 10 compares each of the blocks 42ORa to 42ORe of the first original text data 40OR, not having the appended information 44a to 44e, with the blocks 52ORa to 52ORe of the second original text data 50OR.

The document management system 10 associates one of the blocks 42ORa to 42ORe of the first original text data 40OR with one of the blocks 52ORa to 52ORe of the second original text data 50OR that have a similarity greater than or equal to the determination value through the comparison.

As shown in Section (b) of FIG. 7, the blocks 52TRa to 52TRe of the second translation data 50TR are the candidates to which the appended information 44a to 44e is added.

As shown in Section (c) of FIG. 7, the document management system 10 adds the appended information 44a of the block 42TRa of the first translation data 40TR to the block 52TRa that is associated with the block 52Ora. The block 52ORa is associated with the block 42ORa. In the same manner, the document management system 10 adds the appended information 44*b* to 44*e* of the first translation data 40TR to the second translation data 50TR.

Advantages of Second Embodiment (2-1) Each of the blocks 42ORa to 42ORe of the first original text data 40OR is compared with at least one of the blocks 52ORa to 52ORe of the second original text data 50OR. In a comparative example, each of the blocks 42TRa to 42TRe of the first translation data 40TR is compared with at least one of the blocks 52TRa to 52TRe of the second translation data 50TR. In accordance with the second embodiment, association is performed more easily compared to the comparative example. The reason for this will be described below. In an example, one block of the first original text data 40OR that does not have the appended information 44*a* to 44*e* is identical to one block of the second original text data 50OR to which the appended information 44*a* to 44*e* is not added. Even when the original texts are the same, different translation results may be generated from the two original texts. In the second embodiment, the original texts are compared with each other. Thus, association is performed more easily compared to the comparative example.

Modified Examples

The first and second embodiments can be modified as follows. The first and second embodiments and the following modifications can be combined as long as the combined modifications remain technically consistent with each other.

In the first and second embodiments, each of the first document 40 and the second document 50 is a legal document including a plurality of provisions. However, this is merely an example. Each of the first document 40 and the second document 50 may be a manual having a hierarchical structure.

In the first embodiment, the blocks 42*a* to 42*e* of the first document 40 and the blocks 52*a* to 52*e* of the second document 50 are automatically associated with each other. However, this is merely an example. For example, the document management system 10 may present association candidates to the user, and then perform association when the administrator approves the candidates. The second embodiment can be modified in the same manner.

The person who approves the association candidates is not limited to the administrator who accesses the document management system 10 using the administrator computer 20. For example, the person who approves the association candidates may be a user who accesses the document management system 10 using any of the client computers 30-1, 30-2, . . . , and 30-N.

In the second embodiment, the blocks 42TRa to 42TRe of the first translation data 40TR include the appended information 44*a* to 44*e*. Instead of or in addition to this, the first original text data 40OR may include appended information. The document management system 10 may add appended information related to at least one of the first original text data 40OR and the first translation data 40TR to at least one of the second original text data 50OR and the second translation data 50TR.

In the first and second embodiments, the process shown in FIG. 6 is executed. However, this is merely an example. The document management system 10 may add the appended information 44*a* to 44*e* to the second document 50 immediately after the blocks 42*a* to 42*e* of the first document 40 are associated with the blocks 52*a* to 52*e* of the second document 50. That is, the document management system 10 may add the appended information 44*a* to 44*e* to the second document 50 without obtaining an approval of the user.

In the first and second embodiments, each of the blocks 42*a* to 42*e* of the first document 40 is compared with all of the blocks 52*a* to 52*e* of the second document 50. However, this is merely an example. Each of the blocks 42*a* to 42*e* of the first document 40, from which the appended information 44*a* to 44*e* has been removed, may be compared with at least one of the blocks 52*a* to 52*e* of the second document 50. Specifically, the following process is performed. The document management system 10 compares the block 42*a* with the block 52*a* and determines that the similarity is greater than or equal to the determination value. Accordingly, the document management system 10 associates the block 42*a* with the block 52*a*. Then, the document management system 10 compares the block 42*b* with the block 52*b* and determines that the similarity is greater than or equal to the determination value. Thus, the document management system 10 associates the block 42*b* with the block 52*b*. The document management system 10 repeats the same process. In this manner, the document management system 10 may have a configuration in which the blocks of the first document 40 are not compared to the blocks of the second document 50 that have already undergone the association.

In the first embodiment, the blocks 42*a* to 42*e* of the first document 40 are associated with the blocks 52*a* to 52*e* of the second document 50 on a one-to-one basis. However, this is merely an example. For example, there may be a case in which the second document 50 does not have a block that corresponds to the block 42*b* of the first document 40. In such a case, the block 42*b* of the first document 40 is not associated with any of the blocks of the second document 50.

In the first and second embodiments, the document management system 10 includes the CPU, the RAM, and the storage device 12, and executes software processing. However, this is merely an example. For example, the document management system 10 may include an exclusive hardware circuit (for example, an application specific integrated circuit (ASIC) or the like) that executes at least part of the software processing performed in the above-described embodiment. That is, the document management system 10 may have any one of the following configurations (a) to (c). (a) The document management system 10 includes a processor that executes all processes according to a program and a program storage device such as a ROM that stores the program. In other words, the document management system 10 includes a software execution device. (b) The document management system 10 includes a processor that executes part of processes according to a program and a program storage. The document management system 10 further includes a dedicated hardware circuit that executes the remaining processes. (c) The document management system 10 includes a dedicated hardware circuit that executes all processes. There may be more than one software execution device and/or more than one dedicated hardware circuit. Specifically, the above-described processes may be executed by processing circuitry including at least one of a software execution device and a dedicated hardware circuit. The processing circuitry may include more than one software execution device and more than one dedicated hardware circuit. A program storage device, or computer readable medium, includes any type of medium that is accessible by a versatile computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A document management system, comprising:
a storage device; and
processing circuitry coupled to the storage device, the processing circuitry being configured to perform operations comprising:
storing a first document created by an authority in the storage device;
dividing the first document into blocks based on a hierarchical structure of the first document;
storing and accumulating appended information in the storage device for each of the blocks of the first document, the appended information being data indicating a change added to the first document by a user;
storing a second document created by the authority in the storage device, the second document being a revised version of the first document;
dividing the second document into blocks based on a hierarchical structure of the second document;
comparing each of the blocks of the first document, from which the appended information is removed, with at least one of the blocks of the second document;
associating a first block of the blocks of the first document with a second block of the blocks of the second document, the first block and the second block having a similarity greater than or equal to a determination value through the comparison; and
adding the appended information related to the first block to the second block that is associated with the first block wherein:
the first document includes first original text data and first translation data obtained by translating the first original text data, and the second document includes second original text data and second translation data obtained by translating the second original text data;
blocks of the first original text data are associated with blocks of the first translation data on a one-to-one basis, and blocks of the second original text data are associated with blocks of the second translation data on a one-to-one basis;
the processing circuitry is configured to compare each of the blocks of the first original text data, not having the appended information, with at least one of the blocks of the second original text data;
the processing circuitry is configured to associate a first original text block of the blocks of the first original text data with a second original text block of the blocks of the second original text data, the first original text block and the second original text block having a similarity greater than or equal to the determination value through the comparison; and
when one of the blocks of the first translation data that is associated with the first original text block is a first translation block, and one of the blocks of the second translation data that is associated with the second original text block is a second translation block, the processing circuitry is configured to add the appended information related to the first translation block to the second translation block associated with the first original text block.

2. The document management system according to claim 1, wherein
the processing circuitry is configured to inquire the user whether to add the appended information related to the first block to the second block that is associated with the first block; and
when the user approves the adding, the processing circuitry is configured to add the appended information related to the first block to the second block that is associated with the first block.

3. The document management system according to claim 1, wherein each of the first document and the second document is a legal document including a plurality of provisions.

* * * * *